(12) United States Patent
Stluka et al.

(10) Patent No.: US 12,444,041 B2
(45) Date of Patent: Oct. 14, 2025

(54) BUILDING MANAGEMENT SYSTEM USING VIDEO ANALYTICS

(71) Applicant: HONEYWELL INTERNATIONAL INC., Morris Plains, NJ (US)

(72) Inventors: Petr Stluka, Morris Plains, NJ (US); Chunfu Li, Morris Plains, NJ (US); Hao Chen, Morris Plains, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 558 days.

(21) Appl. No.: 17/593,934

(22) PCT Filed: Apr. 1, 2019

(86) PCT No.: PCT/CN2019/080812
§ 371 (c)(1),
(2) Date: Sep. 28, 2021

(87) PCT Pub. No.: WO2020/199077
PCT Pub. Date: Oct. 8, 2020

(65) Prior Publication Data
US 2022/0189004 A1    Jun. 16, 2022

(51) Int. Cl.
*G06T 7/00* (2017.01)

(52) U.S. Cl.
CPC .... *G06T 7/001* (2013.01); *G06T 2207/10016* (2013.01)

(58) Field of Classification Search
CPC .......... G06T 7/001; G06T 2207/10016; G05B 15/02; G05B 23/0283; G05B 2219/2614; H04N 23/60
See application file for complete search history.

(56) References Cited

U.S. PATENT DOCUMENTS

| | | | | |
|---|---|---|---|---|
| 2010/0324962 | A1* | 12/2010 | Nesler | G05B 17/02 705/412 |
| 2017/0234562 | A1* | 8/2017 | Ribbich | F24F 11/62 700/277 |

(Continued)

FOREIGN PATENT DOCUMENTS

| | | |
|---|---|---|
| CN | 103177391 A | 6/2013 |
| CN | 104247396 A | 12/2014 |

(Continued)

OTHER PUBLICATIONS

CN109443812 Xu et al—WIPO translated (Year: 2019).*

(Continued)

*Primary Examiner* — Jianxun Yang
(74) *Attorney, Agent, or Firm* — Seager, Tufte & Wickhem, LLP

(57) ABSTRACT

Methods and systems for identifying maintenance tasks in a building. An illustrative method may include capturing a plurality of images over time of a component of a building using an image capture device, comparing at least some of the plurality of images to a baseline image of the component to identify a physical change in the component, determining when the physical change in the component exceeds a threshold physical change, and sending a maintenance request to service the component when the physical change in the component exceeds the threshold physical change.

10 Claims, 4 Drawing Sheets

(56) References Cited

U.S. PATENT DOCUMENTS

| | | | | |
|---|---|---|---|---|
| 2018/0029842 A1* | 2/2018 | Li | ............................ | B66B 29/06 |
| 2018/0283716 A1* | 10/2018 | Ribbich | ................. | G05B 15/02 |
| 2018/0372355 A1* | 12/2018 | Mosamkar | ............... | F24F 11/65 |
| 2018/0373234 A1 | 12/2018 | Khalate et al. | | |

FOREIGN PATENT DOCUMENTS

| | | |
|---|---|---|
| CN | 106970578 A | 7/2017 |
| CN | 109443812 A | 3/2019 |
| JP | 2011204029 A | 10/2011 |

OTHER PUBLICATIONS

Examination Report under Section 18(3), Intellectual Property Office, Application No. GB2113599.1, Sep. 11, 2023 (3 pgs).
First Office Action, CN Patent Office, CN Application No. 201980095439.8, Jul. 2, 2023 (27 pages).

\* cited by examiner

BUILDING MANAGEMENT SYSTEM USING VIDEO ANALYTICS

TECHNICAL FIELD

The disclosure generally relates to building management systems, and more particularly to systems and methods for monitoring and/or manipulating conditions in a building to identify and initiate maintenance tasks.

BACKGROUND

Buildings require maintenance to service the occupants of the building. For example, building management systems (BMS) are used to control, for example, one or more heating, ventilation, and air conditioning (HVAC) systems, one or more security systems, one or more lighting systems, one or more fire systems, and/or one or more access control systems. Building systems, which are monitored by the BMS, require routine maintenance. Building maintenance activities also include keeping the building clean and supplies adequately stocked. What would be desirable are methods and systems that improve the detection of items or situations that need maintenance in a building.

SUMMARY

This disclosure generally relates to systems and methods for identifying maintenance tasks in a building based, at least in part, on video analytics. In one example, a method for identifying maintenance tasks includes capturing a plurality of images over time of a component of a building using an image capture device, comparing at least some of the plurality of images to a baseline image of the component to identify a physical change in the component, determining when the physical change in the component exceeds a threshold physical change, and sending a maintenance request to service the component when the physical change in the component exceeds the threshold physical change.

In some cases, the component may include an HVAC component of an HVAC system of the building. The HVAC component may include, for example, a filter, a pressurized vessel or tube, an air conditioning coil, and/or any other suitable HVAC component.

In some cases, the component may include carpet in the building, and the threshold physical change may represent a change in visible dirt on the carpet. In some cases, the component may include a paper dispenser, and the threshold physical change may represent a change in an amount of paper remaining in the paper dispenser. In some cases, the paper dispenser may include a disposable hand towel dispenser, and the threshold physical change may represent a change in a number of disposable hand towels remaining in the disposable hand towel dispenser. In another example, the paper dispenser may include a toilet paper dispenser, and the threshold physical change may represent a change in an amount of toilet paper remaining in the toilet paper dispenser.

In some cases, the component may include a garbage can, and the threshold physical change may represent a change in an amount of garbage in the garbage can. In another example, the component may include office supply repository, and the threshold physical change may represent a change in an amount of an office supply remaining in the office supply repository. In some cases, the office supply may include one or more of copy paper, paper pads, and pens.

In some cases, the method may include sensing one or more environmental conditions in the building, determining when one or more of sensed environmental conditions in the building indicate that a component might need maintenance, capturing images of the component, confirming that the component needs maintenance by analyzing the captured images of the component and noting if the physical change in the component exceeds a threshold physical change, and if confirmed, sending a maintenance request to service the component.

In another example, a system for identifying maintenance tasks in a building may include an input for receiving a plurality of images from an image capture device that is configured to have a field of view that includes a component of a building, an output, a memory, and a controller operatively coupled to the image capture device via the input, the memory and the output. The controller may be configured to store a baseline image captured by the image capture device in the memory, the baseline image including an image of the component of the building, store a plurality of images from the image capture device to the memory over time, each of the plurality of images including an image of the component of the building, compare at least some of the plurality of images to the baseline image of the component to identify a physical change in the component, determine when the physical change in the component exceeds a threshold physical change, and send via the output a maintenance request to service the component when the physical change in the component exceeds the threshold physical change. In some cases, the maintenance request may be a work order with a description of the maintenance required.

In another example, a method for identifying maintenance tasks in a building may include sensing one or more environmental conditions in the building, capturing a plurality of images over time of a component of a building using an image capture device, comparing at least some of the plurality of images to a baseline image of the component to identify a physical change in the component, determining when the physical change in the component exceeds a threshold physical change, determining that the component might need maintenance when the physical change in the component exceeds the threshold physical change, determining when one or more of the sensed environmental conditions in the building also indicate that the same component might needs maintenance, determining that the component needs maintenance when the physical change in the component exceeds the threshold physical change and the one or more of the sensed environmental conditions in the building indicate that the same component might needs maintenance, and sending a maintenance request to service the component when the need for maintenance is determined. In some cases, the one or more environmental conditions in the building may include one or more of a temperature, a pressure, a flow rate and a humidity.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which.

Figure 1:
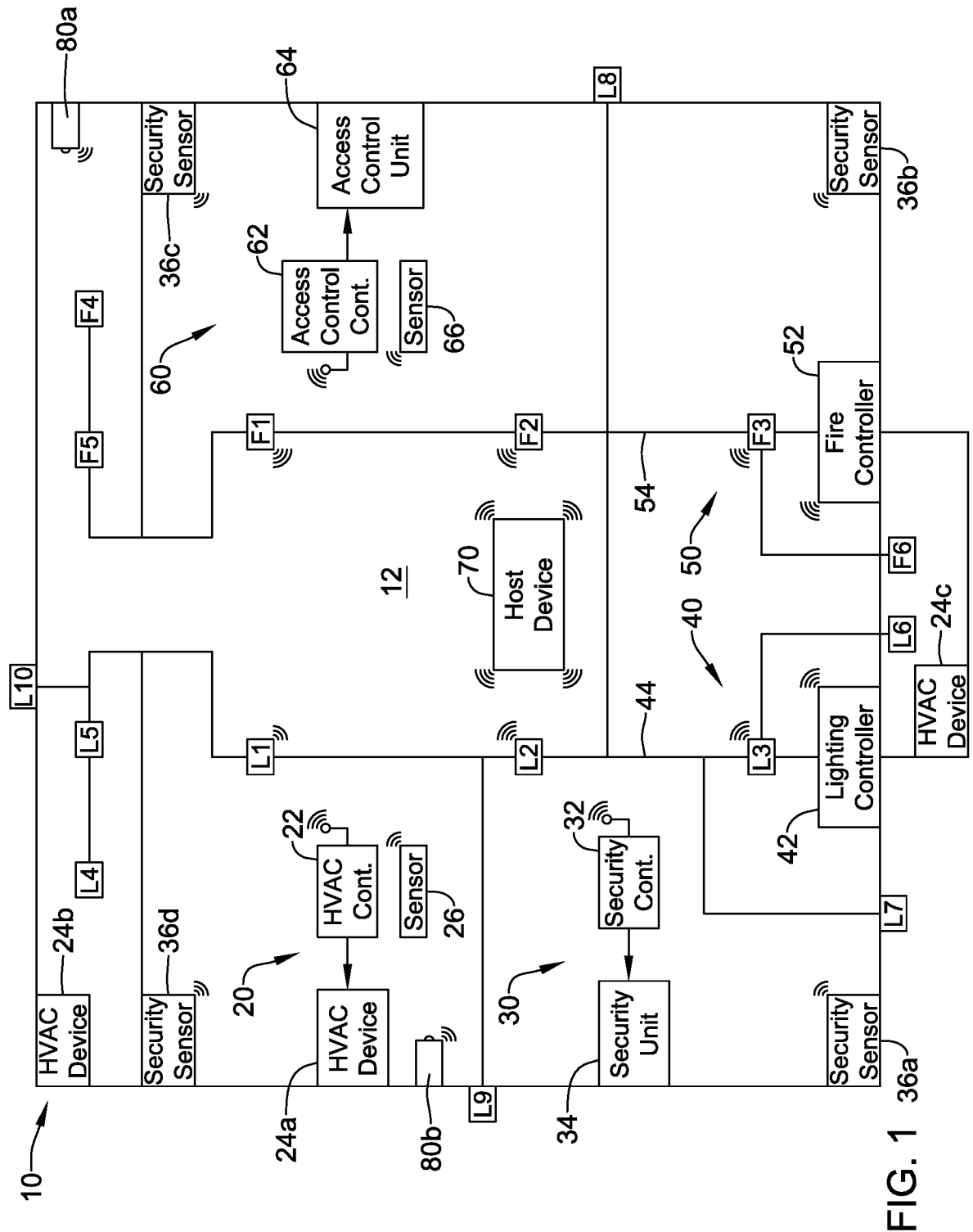
FIG. 1 is a schematic view of an illustrative building or other structure that includes a building management system (BMS) that controls client devices servicing the building or other structure.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

The disclosure generally relates to building management systems, and more particularly to systems and methods for analyzing data obtained from building management systems and image and/or video capturing devices to identify maintenance tasks for the building. FIG. 1 is a schematic view of an illustrative building or structure 10 that includes an illustrative building management system (BMS) 12 for controlling one or more client devices servicing the building or structure 10. The BMS 12, as described herein according to the various illustrative embodiments, may be used to control the one or more client devices in order to control certain environmental conditions (e.g., temperature, ventilation, humidity, lighting, etc.). Such a BMS 12 may be implemented in office buildings, factories, manufacturing facilities, distribution facilities, hospitals, health clubs, movie theaters, restaurants, and even residential homes.

The illustrative BMS 12 shown in FIG. 1 includes one or more heating, ventilation, and air conditioning (HVAC) systems 20, one or more security systems 30, one or more lighting systems 40, one or more fire systems 50, and one or more access control systems 60. These are just a few examples of systems that may be included or controlled by the BMS 12. In some cases, the BMS 12 may include more or fewer systems. In some cases, each system may include a client device configured to provide one or more control signals for controlling one or more building control components and/or devices of the BMS 12.

For instance, in some cases, the HVAC system 20 may include an HVAC control device 22 used to communicate with and control one or more HVAC devices 24a, 24b, and 24c (collectively, 24) for servicing the HVAC needs of the building or structure 10. While the HVAC system 20 is illustrated as including three devices, it should be understood that the structure may include fewer than three or more than three devices 24, as desired. Some illustrative devices may include, but are not limited to a furnace, a heat pump, an electric heat pump, a geothermal heat pump, an electric heating unit, an air conditioning unit, a humidifier, a dehumidifier, an air exchanger, an air cleaner, a damper, a valve, blowers, fans, motors, and/or the like. The HVAC system 20 may further include a system of ductwork and air vents (not explicitly shown). The HVAC system 20 may further include one or more sensors or devices 26 configured to measure parameters of the environment to be controlled. The HVAC system 20 may include more than one sensor or device of each type, as needed to control the system. It is contemplated that large buildings, such as, but not limited to, an office building, may include a plurality of different sensors in each room or within certain types of rooms. The one or more sensors or devices 26 may include, but are not limited to, temperatures sensors, humidity sensors, carbon dioxide sensors, pressure sensors, occupancy sensors, proximity sensors, etc. Each of the sensor/devices 26 may be operatively connected to the controller 22 via a corresponding communications port (not explicitly shown). It is contemplated that the communications port may be wired and/or wireless. When the communications port is wireless, the communications port may include a wireless transceiver, and the controller 22 may include a compatible wireless transceiver. It is contemplated that the wireless transceivers may communicate using a standard and/or a proprietary communication protocol. Suitable standard wireless protocols may include, for example, cellular communication, ZigBee, Bluetooth, WiFi, IrDA, dedicated short range communication (DSRC), EnOcean, or any other suitable wireless protocols, as desired.

In some cases, the security system 30 may include a security control device 32 used to communicate with and control one or more security units 34 for monitoring the building or structure 10. The security system 30 may further include a number of sensors/devices 36a, 36b, 36c, 36d (collectively, 36). The sensor/devices 36 may be configured to detect threats within and/or around the building 10. In some cases, some of the sensor/devices 36 may be constructed to detect different threats. For example, some of the sensor/devices 36 may be limit switches located on doors and windows of the building 10, which are activated by entry of an intruder into the building 10 through the doors and windows. Other suitable security sensor/devices 12 may include fire, smoke, water, carbon monoxide, and/or natural gas detectors, to name a few. Still other suitable security system sensor/devices 36 may include motion sensors that detect motion of intruders in the building 10, noise sensors or microphones that detect the sound of breaking glass, security card pass systems, or electronic locks, etc. It is contemplated that the motion sensor may be passive infrared (PIR) motion sensors, a microwave motion sensor, an ultrasonic motion sensor, a tomographic motion sensor, a video camera having motion detection software, a vibrational motion sensor, etc. In some cases, one or more of the sensor/devices 36 may include a video camera. In some cases, the sensor/devices 36 may include a horn or alarm, a damper actuator controller (e.g. that closes a damper during a fire event), a light controller for automatically turning on/off lights to simulate occupancy, and/or any other suitable device/sensor. These are just examples.

In some cases, the lighting system 40 may include a lighting control device 42 used to communicate with and control one or more light banks 44 having lighting units L1-L10 for servicing the building or structure 10. In some embodiments, one or more of the lighting units L1-L10 may be configured to provide visual illumination (e.g., in the visible spectrum) and one or more of the light units L1-L10 may be configured to provide ultraviolet (UV) light to provide irradiation. The lighting system 40 may include emergency lights, outlets, lighting, exterior lights, drapes, and general load switching, some of which are subject to "dimming" control which varies the amount of power delivered to the various building control devices.

In some cases, the fire system 50 may include a fire control device 52 used to communicate with and control one or more fire banks 54 having fire units F1-F6 for monitoring and servicing the building or structure 10. The fire system 50 may include smoke/heat sensors, a sprinkler system, warning lights, and so forth. In some cases, the access control system 60 may include an access control device 62 used to communicate with and control one or more access control units 64 for allowing access in, out, and/or around the building or structure 10. The access control system 60 may include doors, door locks, windows, window locks, turnstiles, parking gates, elevators, or other physical barrier, where granting access can be electronically controlled. In some embodiments, the access control system 60 may include one or more sensors 66 (e.g., RFID, etc.) configured to allow access to the building or certain parts of the building 10.

In a simplified example, the BMS 12 may be used to control a single HVAC system 20, a single security system 30, a single lighting system 40, a single fire system 50, and/or a single access control system 60. In other embodiments, the BMS 12 may be used to communicate with and control multiple discrete building control devices 22, 32, 42, 52, and 62 of multiple systems 20, 30, 40, 50, 60. The devices, units, and controllers of the systems 20, 30, 40, 50, 60 may be located in different zones and rooms, such as a common space area (a lobby, a break room, etc.), in a dedicated space (e.g., offices, work rooms, etc.) or outside of the building 10. In some cases, the systems 20, 30, 40, 50, 60 may be powered by line voltage, and may be powered by the same or different electrical circuit. It is contemplated that the BMS 12 may be used to control other suitable building control components that may be used to service the building or structure 10.

According to various embodiments, the BMS 12 may include a host device 70 that may be configured to communicate with the discrete systems 20, 30, 40, 50, 60 of the BMS 12. In some cases, the host device 70 may be configured with an application program that assigns devices of the discrete systems to a particular device (entity) class (e.g., common space device, dedicated space device, outdoor lighting, unitary controller, and so on). In some cases, there may be multiple hosts. For instance, in some examples, the host device 70 may be one or many of the control devices 22, 32, 42, 52, 62. In some cases, the host device 70 may be a hub located external to the building 10 at an external or remote server also referred to as "the cloud."

In some cases, the building control devices 22, 32, 42, 52, 62 may be configured to transmit a command signal to its corresponding building control component(s) for activating or deactivating the building control component(s) in a desired manner. In some cases, the building control devices 22, 32, 42, 52, 62 may be configured to receive a classification of the building control component and may transmit a corresponding command signal(s) to their respective building control component in consideration of the classification of the building control component.

In some instances, the building control devices 22, 32, 62 may be configured to receive signals from one or more sensors 26, 36, 66 located throughout the building or structure 10. In some cases, the building control devices 42 and 52 may be configured to receive signals from one or more sensors operatively and/or communicatively coupled with the lighting units L1-L10 and the fire units F1-F6 located throughout the building or structure 10, respectively. In some cases, the one or more sensors may be integrated with and form a part of one or more of their respective building control devices 22, 32, 42, 52, 62. In other cases, one or more sensors may be provided as separate components from the corresponding building control device. In still other instances, some sensors may be separate components of their corresponding building control devices while others may be integrated with their corresponding building control device. These are just some examples. The building control devices 22, 32, 42, 52, 62 and the host device 70 may be configured to use signal(s) received from the one or more sensors to operate or coordinate operation of the various BMS systems 20, 30, 40, 50, 60 located throughout the building or structure 10.

The one or more sensors 26, 36, 66, L1-L10, and F1-F6 may be any one of a temperature sensor, a humidity sensor, an occupancy sensor, a pressure sensor, a flow sensor, a light sensor, a video camera, a current sensor, a smoke sensor and/or any other suitable sensor. In one example, at least one of the sensors 26, 36, 66, or other sensors, may be an occupancy sensor. The building control devices 22, 32, 42, 62 and/or the host device 70 may receive a signal from the occupancy sensor indicative of occupancy within a room or zone of the building or structure 10. In response, the building control devices 22, 32, 42, and/or 62 may send a command to activate one or more building control component(s) located in or servicing the room or zone where occupancy is sensed.

Likewise, in some cases, at least one of the sensors 26 may be a temperature sensor configured to send a signal indicative of the current temperature in a room or zone of the building or structure 10. The building control device 22 may receive the signal indicative of the current temperature from the temperature sensor 26. In response, the building control device 22 may send a command to an HVAC device 24 to activate and/or deactivate the HVAC device 24 that is in or is servicing that room or zone to regulate the temperature in accordance with a desired temperature set point.

In yet another example, one or more of the sensors may be a current sensor. The current sensor may be coupled to the one or more building control components and/or an electrical circuit providing electrical power to one or more building control components. The current sensors may be configured to send a signal to a corresponding building control device, which indicates an increase or decrease in electrical current associated with the operation of the building control component. This signal may be used to provide confirmation that a command transmitted by a building control device has been successfully received and acted upon by the building control component(s). These are just a few examples of the configuration of the BMS 12 and the communication that can take place between the sensors and the control devices.

In some cases, data received from the BMS 12 may be analyzed and used to dynamically (e.g., automatically) trigger service requests or work orders for the various devices 24, 34, 64, L1-L10, F1-F6 and/or sensors 26, 36, 66 in the BMS 12. It is contemplated that data may be received from the control devices 22, 32, 42, 62, devices 24, 34, 64, L1-L10, F1-F6, and/or sensors 26, 36, 66, as desired. In some cases, the data received from the BMS 12 may be combined with video data from image capturing devices. It is contemplated that the video data may be obtained from certain sensors 26, 36, 66 that are image capturing devices associated with discrete systems 20, 30, 60 of the BMS 12 or may be provided as separate image capturing devices such as video (or still-image) capturing cameras 80a, 80b (collectively 80), as desired. While the illustrative building 10 is shown as including two cameras 80, it is contemplated that the building may include fewer than two or more than two cameras, as desired. It is further contemplated that the cameras (either discrete cameras 80 or cameras associated with a discrete system 20, 30, 60) may be considered to be "smart" cameras (which may be an internet of things (IoT) device) are capable of independently processing the image stream or "non-smart" cameras which are used as sensors to collect video information which is analyzed by an independent video analytics engine, as will be described in more detail herein. Some illustrative "non-smart" cameras may include, but are not limited to, drones or thermovision cameras.

It is contemplated that combining data from the BMS 12 with data from the cameras 26, 36, 66, 80 and systematically analyzing said data may allow for additional service actions to be dynamically triggered for a building 10 and/or improve the efficiency of service actions that may already be dynamically triggered. For example, analytics algorithms and decision making processes may be based on richer data (e.g., from both the BMS 12 and video) which may enable more accurate detection of various operational issues. It is contemplated that the service actions may not be limited to the components of the BMS 12. For example, video analytics may allow for the monitoring of consumable supplies, including but not limited to office supplies (e.g., copy paper, pens, etc.), breakroom supplies (e.g., snacks and beverages, napkins, etc.), bathroom supplies (e.g., paper towels, toilet paper, soap, etc.), the monitoring of environmental conditions (e.g., cleanliness), and/or the monitoring of occupant comfort and/or satisfaction of the environment.

Figure 2:
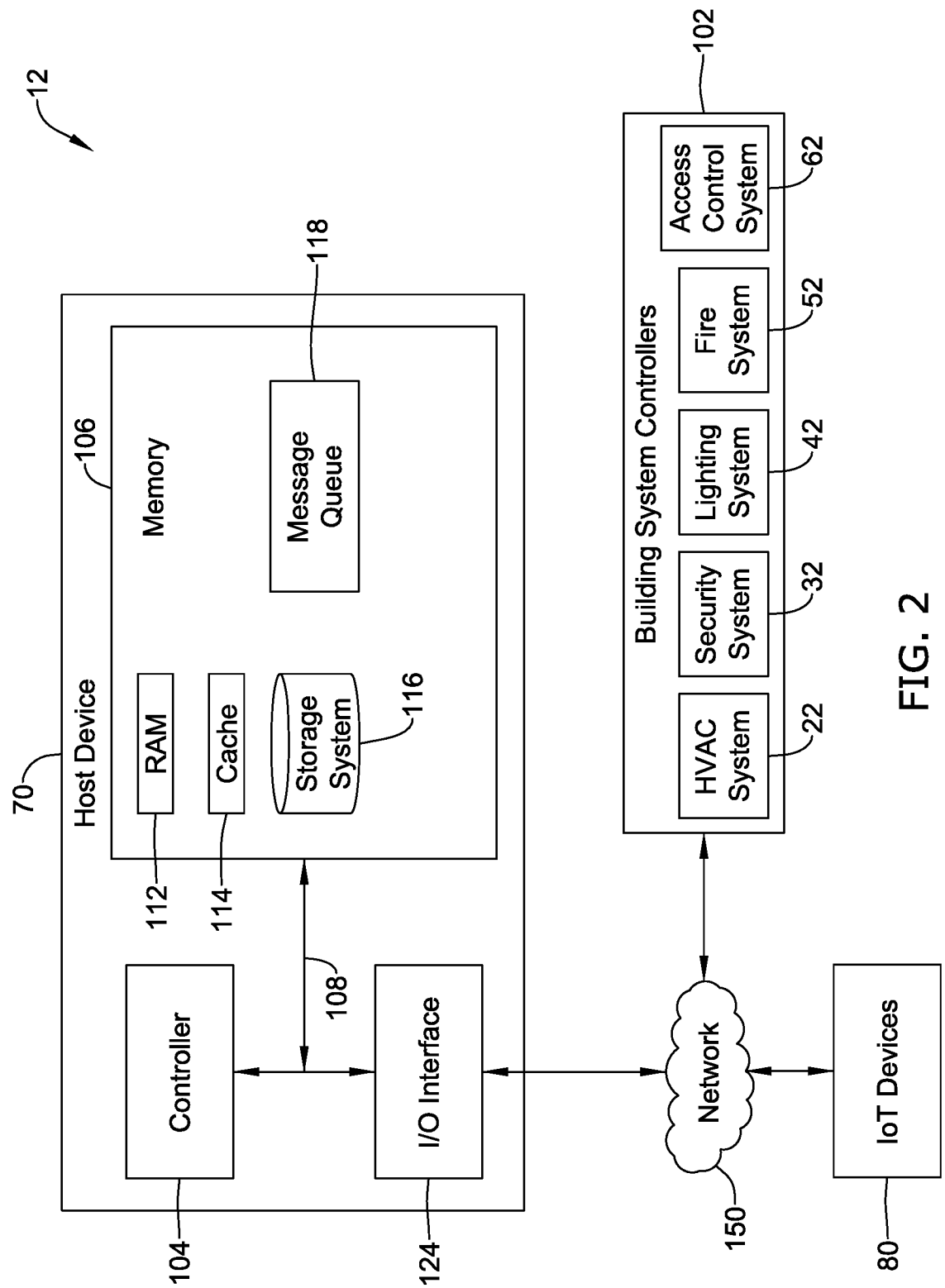
FIG. 2 is a schematic block diagram of the illustrative BMS of FIG. 1, which includes a video analytics system.

Referring additionally to FIG. 2, which is a schematic block diagram of the illustrative BMS 12 of FIG. 1, the host device 70 can function as a server, a client, a local controller, or any other suitable device. In the example shown, the host device 70 can perform various communication and data transfer functions as described herein and can execute one or more application functions. The host device 70 can be any of a variety of computing devices, such as a server computer, a desktop computer, a handheld computer, a tablet computer, a mobile telephone or other mobile device, and the like. The components of the host device 70 may include, but are not limited to, a controller 104, a system memory 106, and a bus 108 that couples various system components including the system memory 106 to the controller 104.

The controller 104 may include one or more controllers or processors that execute instructions stored in the system memory 106. The controller 104 may include a programmable microprocessor. Such a programmable microprocessor may allow a user to modify the control logic of the host device 70 even after it is installed in the field (e.g., firmware update, application update). When provided, the bus 108 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The system memory 106 of the host device 70 can include computer system readable media in the form of volatile memory, such as random access memory (RANI) 112 and/or cache memory 114. The host device 70 may further include other removable/non-removable, volatile/non-volatile computer system storage media. By way of example only, the storage system 116 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 108 by one or more data media interfaces. As will be further depicted and described below, the system memory 106 may include at least one message queue 118 having a set of program modules that are configured to receive and process data points from the IoT devices (e.g., image capturing devices and other internet enabled "smart" devices) and/or the building system controllers 102 and send said data to data storage and/or for further processing, as will be described in more detain herein.

In any scenario, the building system controllers 102 and/or IoT devices may be connected to the host device 70 through any type of connection such as a network (e.g., network 150), including a local area network (LAN) or a wide area network (WAN), or the connection may be made to an external computer (for example, through the Internet using an Internet Service Provider). In various embodiments, the host device 70 may communicate with one or more devices from the various systems of the building system controllers 102 over the network 150. Such communication can occur via Input/Output (I/O) interface(s) 124. In some cases, the controller 104 of the host device 70 may be operatively coupled to I/O interface(s) 124 via the bus 108, and may use the I/O interface 124 to communicate with devices via the building system controllers 102.

Figure 3:
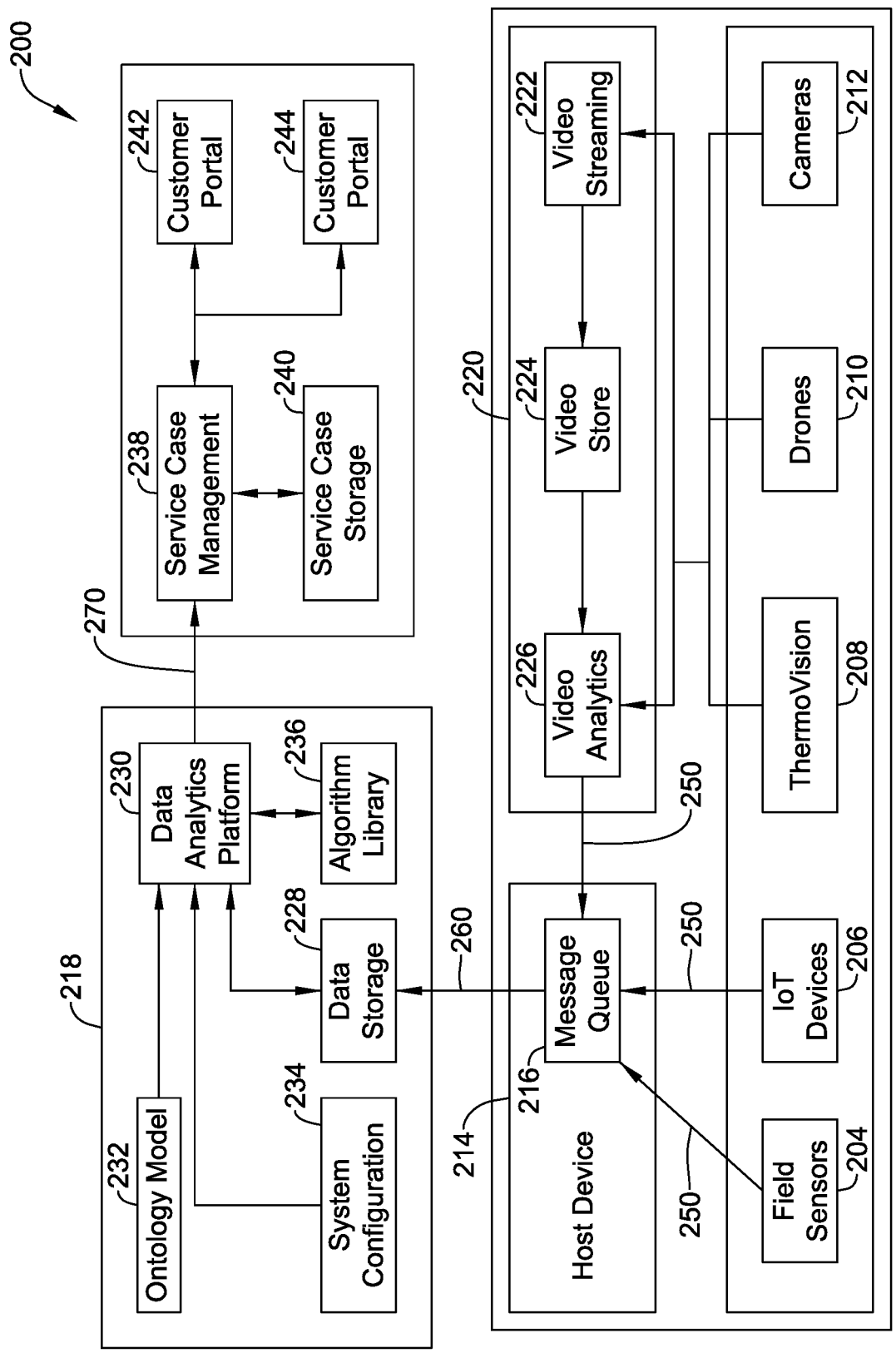
FIG. 3 is a schematic block diagram of an illustrative BMS with a video analytics system.

FIG. 3 is a schematic block diagram of an illustrative BMS and video analytics system 200 for identifying service events in, on, or near a building. The BMS and video analytics system 200 may include a building management system (BMS) 202 which may be similar in form and function the BMS described with respect to FIGS. 1 and 2. In the example shown, the BMS 202 may include one or more field sensors 204, one or more "smart" image capturing devices or other IoT devices 206, one or more thermal cameras 208, one or more drones 210, and/or one or more image capturing devices or cameras 212. The one or more field sensors 204 may include any combination of the sensors/devices 26, 36, L1-L10, F1-F6, 66 described above associated with any of the systems 20, 30, 40, 50, 60 that may form a part of the BMS 12. The one or more "smart" image capturing devices 206 may include "smart" image capturing devices or IoT devices having built-in wireless connectivity, sometimes called "smart" devices or "connected" devices. While not explicitly shown, the building management system 202 also includes devices of the individual system forming the BMS 202. For example, the BMS 202 may include HVAC system and its associated devices (heating equipment, cooling equipment, filters, air handling equipment, dampers, etc.), a security system and its associated devices, a lighting system and its associated devices (e.g., lights, switches, etc.), a fire suppression system and its associated devices (e.g., sprinklers, smoke detectors etc.), and/or a building access system and its associated devices (card readers, electronically controlled access points, etc.).

In some embodiments, the building management system 202 may include a user interface (not explicitly shown) that permits the building management system 202 to display and/or solicit information, as well as accept one or more user interactions. In one example, the user interface may be a physical user interface that is accessible at the building management system 202, and may include a display and/or a distinct keypad. The display may be any suitable display. In some instances, a display may include or may be a liquid crystal display (LCD), and in some cases an e-ink display, fixed segment display, or a dot matrix LCD display. In other cases, the user interface may be a touch screen LCD panel that functions as both display and keypad. The touch screen LCD panel may be adapted to solicit values for a number of operating parameters and/or to receive such values, but this is not required. In still other cases, the user interface may be a dynamic graphical user interface.

In some instances, the user interface need not be physically accessible to a user at the building management system 202. Instead, the user interface may be a virtual user interface that is accessible via the network 250 using a mobile wireless device such as a smart phone, tablet, e-reader, laptop computer, personal computer, key fob, or the like. In some cases, the virtual user interface may be provided by an app or apps executed by a user's remote device for the purposes of remotely interacting with the building management system 202.

The field sensors 204 and/or the "smart" image capturing devices 206 may be in communication with a central host device 214 (similar in form and function to the host device 70 described herein) of the BMS 202. In some cases, a cloud based hub may replace or be used in addition to the host device 214. In some cases, the field sensors 204 and/or "smart" image capturing devices may be in direct communication with the host device 214. In other cases, the field sensors 204 and/or "smart" image capturing devices 206 may be in communication with the host device via an intermediary device such as, but not limited, a system controller. For example, a temperature sensor may provide data to the host device 214 via an HVAC controller. The data from the field sensors 204 and/or "smart" image capturing devices 206 may be received at and/or transferred to a message queue 216 over one or more networks 250, such as a local area network (LAN) and/or a wide area network or global network (WAN) including, for example, the Internet. The data may be processed and coded as a message either at the host device 214 or the "smart" image capturing devices 206 before being subsequently transferred to an analytics system 218 over one or more networks 260, such as a local area network (LAN) and/or a wide area network or global network (WAN) including, for example, the Internet, as will be described in more detail herein. The networks 250, 260 may the same network or different networks, as desired. In some cases, the field sensors 204 and/or IoT devices 206 may have an embedded data analytics engine such that data analysis is performed within the respective device and the analysis results are generated therein and subsequently transferred to the analytics system 218.

The one or more thermal image capturing devices 208, the one or more drones 210 including image capturing devices and/or capabilities, and/or the one or more image capturing devices 212 may be "non-smart" imaging capturing devices. The term "non-smart" as used herein is intended to refer to devices which lack built in wireless connectivity and/or the processing power/equipment to analyze the captured images. The image capturing devices 208, 210, 212 may capture, but are not limited to, still images, video images, infrared images, thermal, etc.). As the image capturing devices 208, 210, 212 may not capable of sending processed data to the message queue 216, the images (as used herein "images" is intended to include still images, video images, infrared images (video and still), thermal images (video and still), and the like) captured may first be transferred to a video module 220. In some instances, the video module 220 may be local to the BMS 202. In other instances, the video module 220 may be remote from the BMS 202. For example, the video module 220 may be located on an external server or cloud network located at a remote location form the building have the BMS 202.

In some cases the images may be transferred to a video streaming module 222 and a video analytics module 226. The video streaming module 222 may allow a user to view the images, although this is not required. The images may be transferred from the video streaming module 222 to a video storage module 224. The images may be stored for a predetermined length of time before being erased or overwritten, or may be stored indefinitely, as desired. The images may be analyzed at the video analytics module 226. It is contemplated that the video analytics module 226 may include dedicated models to identify different particular states or events, such as a water leak, body language, etc. The models may trained on a plurality (e.g., in the range of millions) of training samples to increase accuracy.

The image capturing devices 206, 208, 210, 212 may be configured to capture images related to a certain portion of the building. For example, it may be desirable to have an image capturing device 206, 208, 210, 212 capturing images of components related to the physical building and/or system components of the BMS 202 including but not limited to insulation, windows, air-conditioning units that are based on the roof, HVAC equipment (e.g., monitoring for damage, leaks, corrosion, dirt, etc.). Image capturing devices 206, 208, 210, 212 may also be positioned to trigger corrective actions related to the office equipment and/or appliances. For example, the corrective actions may relate to copiers or printers (e.g., no paper in the paper dispenser), drinking fountains (e.g., no water), vending machines (e.g., some goods not available), washrooms (e.g., no soap in a soap dispenser, no hand towels in a hand towel dispenser, no toilet paper in a toilet paper dispenser, etc.), or kitchen corners or break rooms (e.g., no coffee, sugar, etc.). It is further contemplated that the image capturing devices 206, 208, 210, 212 may be positioned to trigger corrective actions related to cleaning services. For example, cleaning services may relate to dirty or wet floors, dirty carpets, dirty windows, dirty light scones, a mess in a kitchen or washroom, etc. It is contemplated that the type of image capturing device 206, 208, 210, 212 used may be selected based on the change to be detected. For example, thermovision or thermal imaging cameras can be used to locate parts of insulation responsible for likely heat losses. The above examples of types of events that may trigger a service event are not intended to be limiting, but rather illustrative. It is contemplated that the detectable events may vary based on the building in which the system 200 is deployed. For example, a manufacturing facility may monitor and detect changes in different components from an office building.

In some cases, the images from any of the image capturing devices 206, 208, 210, 212 may be compared to a baseline image to identify differences related to a physical change in a component in the images. For example, an image of a room, of a component of the BMS 202, of a piece of equipment, etc. may be acquired under desirable operational conditions to be used as a baseline. The captured images may be compared to the baseline to determine if there has been a physical change in any of the components in the image. In some instances, the physical change may be binary (e.g., present or not present) or may be required to exceed a threshold physical change to trigger a service event. For example, a hand towel dispenser that is 50% full, while different from a hand towel dispenser that is 100% full, may not meet the threshold physical change while a hand towel dispenser that is 10% full may meet the threshold physical change and trigger a service event. This is just an example, and not intended to be limiting.

As described above, the change may be in an operational component (e.g., an HVAC component such as but not limited to a pressurized tube or vessel, an air conditioning coil, etc.) of a system (e.g., an HVAC system), in a consumable good in a breakroom, a bathroom, an office supply repository, or other room (e.g., paper towels, toilet paper, paper pads, pens, copy paper, etc.), a cleanliness of a space (e.g., a spill on a counter in breakroom, garbage in a garbage can, visible dirt on a carpet, etc.), etc. It is further contemplated that the captured images may be analyzed using facial recognition. For example, the facial expressions of a person or persons in the image may be analyzed to determine if the person(s) look displeased or upset with the environment. In some cases, a person(s) may be able to provide feedback (e.g., using, for example, an app on a mobile device) regarding their satisfaction and/or dissatisfaction with the appearance or comfort level of a space. The feedback may be used to refine algorithms related to facial recognition or body language analysis. As will be discussed in more detail herein, a maintenance request to service the component may be generated when the physical change in the component exceeds the threshold physical change.

It is contemplated that a plurality of images from one or more of the image capturing devices 208, 210, 212 may be captured over a period of time. The images may be analyzed at the device itself (if the device is capable) or the video analytics module 226 continuously, as they are received at the video analytics module 226, and/or at predetermined time intervals (e.g., every 10 minutes), as desired. Once the image analysis is complete, the video analytics module 226 may send the outcome to the host device 214 and/or message queue 216 over a network 250, such as a local area network (LAN) and/or a wide area network or global network (WAN) including, for example, the Internet. It is contemplated that the actual images are not transferred to the host device 214 and/or message queue 216 to reduce the amount of data sent as well as protect privacy of building occupants.

The message queue 216 may combine and send the coded data (e.g., coded messages) received from the field sensors 204, IoT devices 206, and/or video analytics module 226 to a data storage module 228 within an analytics system 218. The analytics system 218 may be a computer or processing system local to the building having the BMS 202. In other embodiments, the analytics system 218 may be a remote server or cloud network located remotely from the building having the BMS 202. In either event, the analytics system 218 may include a controller having at least a processor and a memory for storing information, such as, but not limited to ontology models, system configuration information, sensor data, algorithms, etc. The memory may be any suitable type of storage device including, but not limited to, RAM, ROM, EPROM, flash memory, a hard drive, and/or the like. In some cases, the processor may store information within the memory and may subsequently retrieve the stored information from the memory. The analytics system 218 may further include an input/output block (I/O block) for receiving one or more signals from the host device and/or for communicating with the building management system 202. The I/O block may be wired and/or wireless. In some cases, the video analytics module 226 and/or other components of the video module 220 may be incorporated into the analytics system 218 such that a single controller is storing baseline images, currently captured images, performing the comparison between baseline and current images, determining when a change in the current images exceeds a threshold physical changes, performing an integrated analysis with addition field sensor data and building data, maintaining data storage, and sending out the maintenance request.

The data storage module 228 may be in communication with a data analytics platform or module 230. The data analytics module 230 may be configured to perform an integrated data analysis by combining data received from external sensors and image capturing devices 204, 206, 208, 210, 212 to determine if the conditions for triggering a service event are held. It is contemplated that the data analytics module 230 may utilize building information obtained from an ontology module 232, system configuration information from a system configuration module 234, and/or algorithms from algorithm library 236 in addition to the data received from external sensors and image capturing devices 204, 206, 208, 210, 212 to determine if the conditions for triggering a service event are held.

The ontology model 232 may include information regarding the building having the BMS 202. For example, the ontology model 232 may include building dimensions, a number of floors, locations of doors, windows, corridors, and/or rooms, equipment information, a two-dimensional building map, a three-dimensional map, etc. to provide contextual information to the data analytics module 230. For example, the ontology module 232 may help the algorithms used in the data analytics module 230 understand the real-world and then generate domain related events. The system configuration module 234 may include equipment information for the various systems in the BMS 202. For example, the system configuration module 234 may include information regarding the types, locations, and/or ages of equipment forming the HVAC system, security system, lighting system, fire suppression system, and/or access control system of the BMS 202. In some cases, the system configuration module 234 may also include system set points, schedules, and other operational parameters. The algorithm library 236 may be a library of algorithms which can be used to facilitate data analysis. The algorithms may be generated using a machine learning module (e.g., learned algorithms based on prior events and/or conditions) or may be user generated and stored in the library 236, as desired. The algorithm library 236 may include a plurality of algorithms each of which may be applicable to different types of detected conditions. For example, algorithm library 236 may include algorithms specific to HVAC equipment, supply replenishment, cleanliness, building maintenance, etc.

When the data analytics module 230 has determined that a service event has occurred, the data analytics module 230 may communication the event to a service case management system 238 over a network 270, such as a local area network (LAN) and/or a wide area network or global network (WAN) including, for example, the Internet. The network 270 may be the same or different from the networks 250, 260. For example, in some embodiments, some portions of the BMS and video analytics system 200 may be in communication over a LAN while other portions of the BMS and video analytics system 200 may communicate over a WAN. Some portions of the BMS and video analytics system 200 may be configured to communicate over both a LAN and a WAN. The service case management system 238 may generate an action to completed work order which is transferred to a customer portal 242 and/or a mobile device 244. The customer portal 242 may be accessible via a network, such as, but not limited to a local area network (LAN) or a wide area network or global network (WAN), such as the internet. In some cases, the customer portal 242 may be accessible via an external or remote server also referred to as "the cloud." The mobile device 244 may include one or more application program codes (i.e., apps) stored in the memory thereof which is configured to receive and display the work order. The customer portal 242 and/or the mobile device 244 may be configured to display the work order to a user of said customer portal 242 and/or the mobile device 244. The work order may include information such as, the location of the problem, the type of service needed, an urgency of the work to be performed, etc. It is contemplated that the customer portal 242 and/or the mobile device 244 may be associated with a service company responsible for fixing an issue and/or building management tasked with notifying the party responsible for fixing the issue. Service events and/or work orders may be transferred from the service case management system 238 may be stored in service case storage module 240. This data may be analyzed to improve the algorithms stored in the algorithm library 236 or to identify trends such that maintenance or service can be performed before the service event occurs.

The service case management system 238 may be a computer or processing system local to the building having the BMS 202. In other embodiments, the service case management system 238 may be a remote server or cloud network located remotely from the building having the BMS 202. In some cases, the service case management system 238 may be a part of the analytics system 218 while in other cases, the service case management system 238 may be separate from the analytics system 218. In any event, the service case management system 238 may include at least a processor and a memory for storing information, such as, but not limited to service events, contact information, work orders, etc. The memory may be any suitable type of storage device including, but not limited to, RAM, ROM, EPROM, flash memory, a hard drive, and/or the like. In some cases, the processor may store information within the memory and may subsequently retrieve the stored information from the memory. The service case management system 238 may further include an input/output block (I/O block) for receiving one or more signals from the analytics system 218. The I/O block may be wired and/or wireless.

In some embodiments, any or all of the host device 214, video module 220, analytics system 218, and/or service case management system 238 may include user interface that permits information to be displayed, solicits information, and/or accepts one or more user interactions. In one example, the user interface may be a physical user interface that is accessible to a user, and may include a display and/or a distinct keypad. The display may be any suitable display. In some instances, a display may include or may be a liquid crystal display (LCD), and in some cases an e-ink display, fixed segment display, or a dot matrix LCD display. In other cases, the user interface may be a touch screen LCD panel that functions as both display and keypad. The touch screen LCD panel may be adapted to solicit values for a number of operating parameters and/or to receive such values, but this is not required. In still other cases, the user interface may be a dynamic graphical user interface.

In some instances, the user interface need not be physically accessible to a user. Instead, the user interface may be a virtual user interface that is accessible via one or more of the networks 250, 260, 270 using a mobile wireless device such as a smart phone, tablet, e-reader, laptop computer, personal computer, key fob, or the like. In some cases, the virtual user interface may be provided by an app or apps executed by a user's remote device for the purposes of remotely interacting with the BMS and video analytics system 200.

Figure 4:
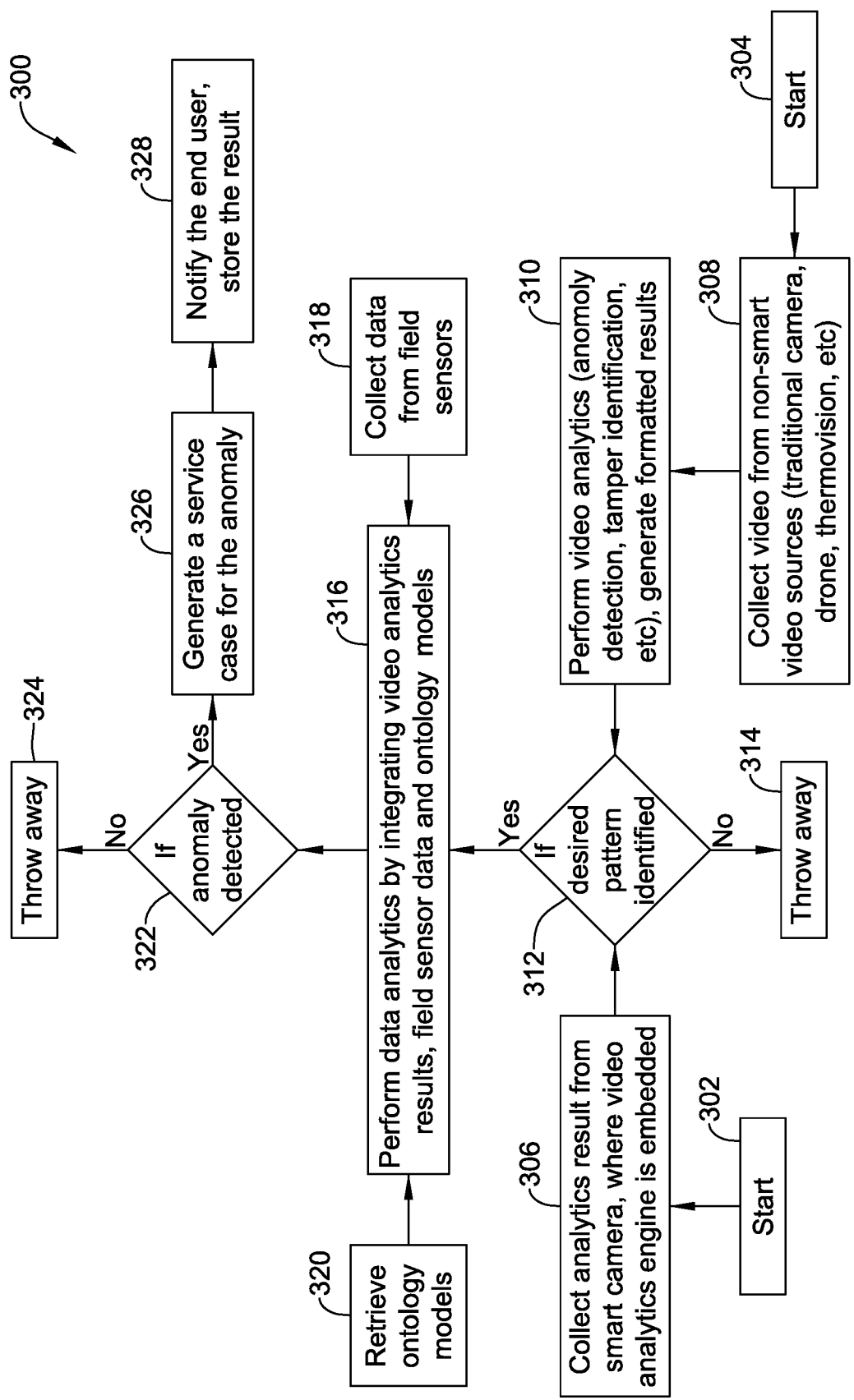
FIG. 4 is an illustrative flow chart of a method for analyzing BMS and video data.

FIG. 4 is an illustrative flowchart of a method 300 for analyzing BMS and video data. It is contemplated that the method may begin at two separate start points 302, 304 if two different type of image capturing devices are present (e.g., "smart" image capturing devices 206 and "non-smart" image capturing devices 208, 210, 212). The starts 302, 304 may occur substantially simultaneously such that the data from each type of device is collected in parallel or the starts 302, 304 may occur sequentially such data from one type of device is collected followed by the other. It is further contemplated that while the image capturing devices 206, 208, 210, 212 are described as initially identifying a threshold change that prompts the integrated analysis with the field sensors 204 and/or the ontology model 232 verifying the event detected at the image, in some cases, a threshold change in a field sensor 204 may prompt or initiate the integrated analysis with the images being used to verify the event detected at the field sensor 204.

Beginning at the start 302 for "smart" image capturing devices 206, as the "smart" image capturing devices 206 are configured to process the images within the device, the analytics results, as determined by the "smart" image capturing devices 206 may be collected, as shown at block 306. The results may be collected by sending the results to the BMS system host device 214 (sometimes within a message queue 216 within the host device) and then by sending the results from the "smart" image capturing devices to a data storage module 228 within the analytics system 218. In some cases, the "smart" image capturing devices 206 may bypass the host device 214 and send the analytics results directly to the data storage module 228. At this point, the method 300 merges with the analytics results from the "non-smart" image capturing devices 208, 210, 212. For brevity, the analysis of the images from the "non-smart" image capturing devices 208, 210, 212 will be described before continuing with the rest of the analysis method 300.

Beginning at the start 304 for "non-smart" image capturing devices 208, 210, 212, the data from said image capturing devices 208, 210, 212 may be collected and transferred to a video analytics module 226, as shown at block 308. It is contemplated that the images may be transferred or collected through a wired connection, a removable memory card, a wireless connection, etc. The video analytics module 226 may then perform video analytics on the collected images, as shown at block 310. The analysis may include, but is not limited to, anomaly detection, tamper identification, body language analysis, etc. The results from the video analytics module 226 may be formatted into a coded message and transferred to the BMS system host device 214 (sometimes within a message queue 216 within the host device) and then by sending the results from the "non-smart" image capturing devices to a data storage module 228 within the analytics system 218. In some cases, the video analytics module 226 may bypass the host device 214 and send the analytics results directly to the data storage module 228.

The analytics system 218 may be configured to analyze the results from the "smart" image capturing devices 206 and the "non-smart" image capturing devices 208, 210, 212 to determine if a desired or predetermined pattern or scenario is present in the results, as shown at block 312. As the results from both the "smart" image capturing devices 206 and the "non-smart" image capturing devices 208, 210, 212 are processed in the same manner from this point forward in the method 300, both sets of image analytics results will be collectively referred to as image analytics results. If there is no desired or predetermined pattern or scenario, the image analytics results may be discarded or ignored, as shown at block 314. If there is a desired or predetermined pattern or scenario, further data analytics will be performed as shown at block 316. It is contemplated that when more than one image is being analyzed, some image analytics results may be discarded 314 while others are further analyzed 316.

The further analysis at 316 may include integrating the image analytics results with data from field sensors 204 and ontology models 232. For example, the data analytics module 230 may retrieve ontology models 232, as shown at block 320, to provide contextual data when performing the integrated analysis (e.g., analysis combining image data and sensor data). The data analytics module 230 may also collect data from field sensors 204. In some cases, the field sensors 204 may provide information regarding environmental conditions of the building, such as, but not limited to temperature, pressure, flow rates, humidity, etc. In other cases, the field sensors 204 may provide data specific to particular pieces of operation equipment. It is contemplated that the data from the field sensors 204 may be retrieved from the data storage module 228 of the analytics system 218 or may be retrieved from the host device 214 and/or message queue 216 of the BMS 202. The data analytics module 230 may then analyze image analytics results with the data from the field sensors 204 and the ontology model 232 providing additional information. Some specific, but non-limiting analysis scenarios will be described in more detail below. The data analytics module 230 may determine if an anomaly is detected, as shown at block 322. An anomaly may be a malfunction piece of equipment, underperforming equipment, lack of cleanliness, lack of supplies, perceived dissatisfaction with an environment, etc. If an anomaly is not detected, the results from the integrated data analysis may be discarded or ignored, as shown at block 324. If an anomaly is detected, a service case may be generated, as shown at block 326. The service case or work order may be sent to an end user and the service case and the results from the data analytics module 230 stored, as shown at block 328. It is contemplated that the end user may be a service company, a service technician, building management, or other person responsible for correcting the anomaly.

Referring again to FIG. 3, in a first illustrative use scenario, a "non-smart" image capturing device 212 may be installed to monitor a chilled water supply pipe of a chiller plant. The "non-smart" image capturing device 212 may be configured to record video of the supply pipe and/or stream sequences of images during a monitoring period. It is contemplated that the monitoring period may be continuous, at predefined intervals, or may be linked to another variable. For example, the monitoring period may occur when water is flowing through the supply pipe. The video stream 222 may be stored in the video store 224. The video stream 222 may be analyzed periodically at predetermined intervals or randomly, as desired, at the video analytics module 226. The video analytics module 226 may include specific algorithms to identify specific anomalies in the images. For example, in this use case, the video analytics module 226 may include at least a dedicated leakage detection algorithm. If the video analytics module 226 outputs a positive signal indicating an anomaly (in the present use case, a positive signal may be indicative of a leak), an alarm notification or signal may be queued to the host device 214 and/or an IoT hub (for a cloud based system) which may be subsequently transferred to the analytics system 218. The intermediate results (e.g., the positive signal from the video analytics module 226) may be transferred to the data storage module 228 in the analytics system 218. The BMS 202 may also be collecting data from field sensors 204 substantially simultaneously with the collection of the image stream that generated the positive result. In the present use case, some relevant field sensors may include a chilled water supply temperature sensor and a chilled water supply pressure sensor. The data from these sensors may be collected and sent to the data storage module 228 in the analytics system 218 directly or via the host device 214 and/or an IoT hub (for a cloud based system).

After receiving the leakage notification from the video analytics module 226 is received, the data analytics module 230 may begin an integrated data analysis. To begin the analysis the video analytics module 226 may retrieve the ontology model for the chiller plant to get information regarding the chilled water supply pipe, including, but not limited to, its location, size, the supply relationship, corresponding sensors attached to the chilled water supply pipe, etc. The video analytics module 226 may then retrieve a leakage specific algorithm from the algorithm library 236 and perform an integrated data analysis by combining the results from the video analytics module 226, the data from the field sensors 204 (e.g., pressure, temperature, etc.) and ontology models 232. In some cases, the current system configuration information can also be retrieved from the system configuration module 234 to obtain information such as, but not limited to, system identification, algorithm setting, and operational parameters, etc. Using the integrated analysis, a fluid leaking can be confirmed (or not). In some cases, if sufficient pressure sensors are available, a location of the leak may be identified by pressure gradients within the pipe. The service case may be generated and processed by the service case management system 238. The service case may be sent to a customer portal 242 and/or a mobile device 244 (using, for example, a mobile app as an interface) to ultimately notify the person or persons responsible for repairing the leak. The service case may also be stored in service case storage 240 for record keeping and querying.

In another illustrative use scenario, a "non-smart" image capturing device 210, such as a drone having image capturing capabilities may be used to evaluate the quality of insulation, a building envelope, and/or other difficult to access portions of a building. The drone 210 may be equipped with a camera that is recording and/or directly streaming a sequence of images taken during the inspection. The video stream 222 generated by the camera of the drone 210 may be recorded in the video store 224. The video stream 222 may be analyzed periodically at predetermined intervals or randomly, as desired, at the video analytics module 226. The video analytics module 226 may include specific algorithms to identify specific anomalies in the images. For example, in this use case, the video analytics module 226 may include at least an algorithm trained to detect areas that indicate potential damage on the building envelope. The algorithm may be developed using a trained classification model.

The video analytics module 226 outputs a positive signal indicating for each anomaly (in the present use case, a positive signal may be indicative of a potential damage), an alarm notification or signal may be queued to the host device 214 and/or an IoT hub (for a cloud based system) which may be subsequently transferred to the analytics system 218. The intermediate results (e.g., the positive signal(s) from the video analytics module 226) may be transferred to the data storage module 228 in the analytics system 218. The BMS 202 may also be collecting data from field sensors 204 substantially simultaneously with the collection of the image stream that generated the positive result. In the present use case, the positive signal may be indicative of damaged insulation and some relevant field sensors may include a temperature profiles of rooms adjacent to the areas with potential damage and/or related HVAC performance. The data from these sensors may be collected and sent to the data storage module 228 in the analytics system 218 directly or via the host device 214 and/or an IoT hub (for a cloud based system).

After receiving the potential damage notification from the video analytics module 226 is received, the data analytics module 230 may begin an integrated data analysis. To begin the analysis the video analytics module 226 may retrieve the ontology model to identify specific rooms and parts of the HVAC system that are likely to be affected by the damaged insulation. The video analytics module 226 may also retrieve a specific algorithm from the algorithm library 236 and perform an integrated data analysis by combining the results from the video analytics module 226, the data from the field sensors 204 (e.g., temperature, HVAC performance, etc.) and ontology models 232 to identify possible deviations that might correspond with a damaged building envelop. Using the integrated analysis, damage can be confirmed (or not). The service case may be generated and processed by the service case management system 238. The service case may be sent to a customer portal 242 and/or a mobile device 244 (using, for example, a mobile app as an interface) to ultimately notify the person or persons responsible for repairing the damage. The service case may also be stored in service case storage 240 for record keeping and querying.

The various modules described herein disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method for identifying maintenance tasks in a building that includes a Building Management System (BMS), wherein the BMS system of the building includes one or more of an HVAC system, a security system, a lighting system, a fire system and an access control system, the method comprising:
    retrieving an ontology model of the BMS, wherein the ontology models defines contextual information for one or more BMS components of the BMS including a particular BMS component, the contextual information including a plurality of properties and one or more relationships defined between two or more of the properties;
    retrieving one or more system configuration parameters of the BMS, wherein the system configuration parameters include one or more system algorithm settings and one or more system operational parameters;
    sensing one or more environmental conditions in the building;
    capturing a plurality of images over time of the particular BMS component of the BMS system using an image capture device, wherein the particular BMS component includes one of an HVAC system component, a security system component, a lighting system component, a fire system component and an access control system component;
    determining when the particular BMS component needs maintenance based at least in part on:
        one or more of the environmental conditions in the building;
        one or more of the plurality of images of the particular BMS component;
        the ontology model; and
        one or more of the system configuration parameters;
    sending a maintenance request to service the particular BMS component when the particular BMS component is determined to need maintenance.

2. The method of claim 1, wherein determining when the particular BMS component needs maintenance comprises:
    comparing at least some of the plurality of images of the particular BMS component to a baseline image of the particular BMS component to identify a physical change in the particular BMS component; and
    determining when the physical change in the particular BMS component exceeds a threshold physical change.

3. The method of claim 2, wherein the physical change includes a physical change in the cleanliness of the particular BMS component.

4. The method of claim 2, wherein the particular BMS component comprises a filter.

5. The method of claim 2, wherein the particular BMS component comprises an air conditioning coil.

6. A system for identifying maintenance tasks in a building that includes a Building Management System (BMS), wherein the BMS system of the building includes one or more of an HVAC system, a security system, a lighting system, a fire system and an access control system, the system comprising:
    an input for receiving:
        a plurality of images from an image capture device that is configured to have a field of view that includes a particular BMS component of the BMS system of the building, wherein the particular BMS component includes one of an HVAC system component, a security system component, a lighting system component, a fire system component and an access control system component;
        one or more environmental conditions in the building;
    an output;
    a memory for storing:
        an ontology model of the BMS, wherein the ontology models defines contextual information for one or more BMS components of the BMS including the particular BMS component, the contextual information including a plurality of properties and one or more relationships defined between two or more of the properties;
one or more system configuration parameters of the BMS, wherein the system configuration parameters include one or more system algorithm settings and one or more system operational parameters;
a controller operatively coupled to the image capture device via the input, the memory and the output, the controller configured to:
   determining when the particular BMS component needs maintenance based at least in part on:
      one or more of the environmental conditions in the building received via the input;
      one or more of the plurality of images of the particular BMS component received via the input;
      the ontology model stored in the memory; and
      one or more of the system configuration parameters stored in the memory;
   sending via the output a maintenance request to service the particular BMS component when the particular BMS component is determined to need maintenance.

7. The system of claim 6, wherein the input, output, memory and controller are part of a server.

8. The system of claim 6, wherein the maintenance request is a work order with a description of the maintenance required.

9. A method for identifying maintenance tasks of a building that includes a Building Management System (BMS), wherein the BMS system of the building includes one or more of an HVAC system, a security system, a lighting system, a fire system and an access control system, the method comprising:
   retrieving an ontology model of the BMS, wherein the ontology models defines contextual information for one or more BMS components of the BMS including a particular BMS component, the contextual information including a plurality of properties and one or more relationships defined between two or more of the properties;
   retrieving one or more system configuration parameters of the BMS, wherein the system configuration parameters include one or more system algorithm settings and one or more system operational parameters;
   retrieving a plurality of images captured over time of the particular BMS component;
   sensing one or more environmental conditions in the building;
   determining when the particular BMS component needs maintenance based at least in part on:
      one or more of the environmental conditions in the building;
      one or more of the plurality of images of the particular BMS component;
      the ontology model; and
      one or more of the system configuration parameters;
   sending a maintenance request to service the particular BMS component when the particular BMS component is determined to need maintenance.

10. The method of claim 9, wherein the one or more environmental conditions in the building include one or more of a temperature, a pressure, a flow rate and a humidity.

* * * * *